United States Patent [19]
Sasaki

[11] Patent Number: 5,890,081
[45] Date of Patent: Mar. 30, 1999

[54] AUTOMOTIVE VEHICLE SUSPENSION CONTROL SYSTEM

[75] Inventor: Mitsuo Sasaki, Atsugi, Japan

[73] Assignee: Unisia Jecs Corporation, Atsugi, Japan

[21] Appl. No.: 676,810

[22] Filed: Jul. 8, 1996

[30] Foreign Application Priority Data

Jul. 6, 1995 [JP] Japan ................................ 7-170605

[51] Int. Cl.⁶ .............................................. B60G 17/015
[52] U.S. Cl. .......................................... 701/37; 280/5.515
[58] Field of Search .................... 701/37, 38, 39; 280/707, 840, 5.515

[56] References Cited

U.S. PATENT DOCUMENTS

| Re. 34,628 | 6/1994 | Fujishiro et al. | 280/707 |
|---|---|---|---|
| 4,696,489 | 9/1987 | Fujishiro et al. | 280/707 |
| 4,970,645 | 11/1990 | Adachi et al. | 701/38 |
| 5,096,219 | 3/1992 | Hanson et al. | 280/707 |
| 5,485,377 | 1/1996 | Sasaki et al. | 280/707 |
| 5,488,556 | 1/1996 | Sasaki | 701/37 |
| 5,490,068 | 2/1996 | Shimizu et al. | 701/38 |
| 5,510,985 | 4/1996 | Yamaoka et al. | 701/37 |
| 5,515,273 | 5/1996 | Sasaki et al. | 701/37 |
| 5,521,821 | 5/1996 | Shimizu et al. | 701/37 |
| 5,526,262 | 6/1996 | Kimura et al. | 701/38 |
| 5,572,426 | 11/1996 | Sasaki et al. | 701/37 |
| 5,638,275 | 6/1997 | Sasaki et al. | 701/38 |

FOREIGN PATENT DOCUMENTS

| 0 616 912 A1 | 9/1994 | European Pat. Off. |
|---|---|---|
| 0 645 266 A2 | 3/1995 | European Pat. Off. |
| 42 26 050 A | 2/1993 | Germany . |
| 61-163011 | 7/1986 | Japan . |
| 2 281 723 | 3/1993 | United Kingdom . |
| 2 261 491 | 5/1993 | United Kingdom . |

OTHER PUBLICATIONS

Patent Abstracts of Japan, vol. 10, No. 368 (M–543), 9 Dec. 1986 & JP 61 163011 A (Nissan), 23 Jul. 1986.

*Primary Examiner*—Gary Chin
*Attorney, Agent, or Firm*—Foley & Lardner

[57] ABSTRACT

A suspension control system for use with shock absorbers provided between sprung and unsprung masses of an automotive vehicle at the positions of the respective vehicle road wheels for providing variable damping force characteristics. Sprung mass vertical velocities at the respective road wheel positions are derived from a sensed sprung mass vertical behavior. Relative velocities between the sprung and unsprung masses at the respective road wheel positions are derived from the sensed sprung mass vertical behavior with the use of a predetermined transfer function including terms related to damping coefficients of the respective shock absorbers. A control unit is provided for producing control signals based on the derived sprung mass vertical velocities and the derived relative velocities to control the damping force characteristics of the respective shock absorbers. Damping coefficients of the respective shock absorbers are determined based on the corresponding control signals. The terms related to the damping coefficients of the respective shock absorbers are varied according to the determined damping coefficients.

12 Claims, 19 Drawing Sheets

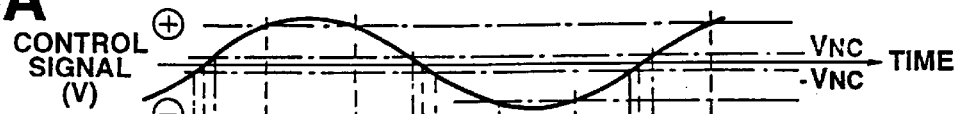
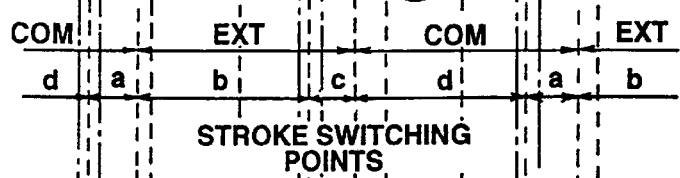
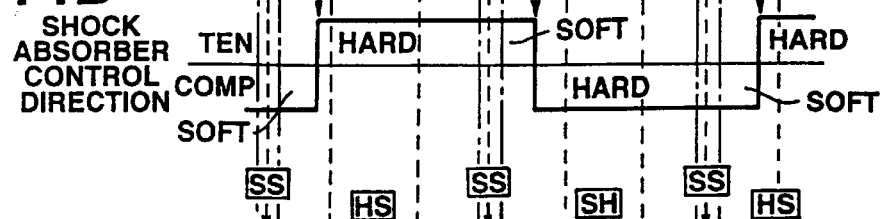
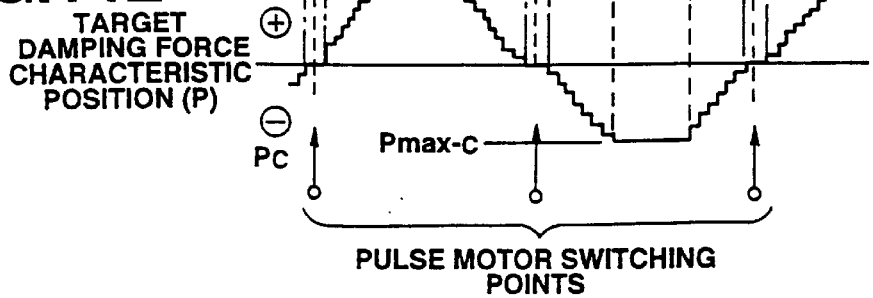

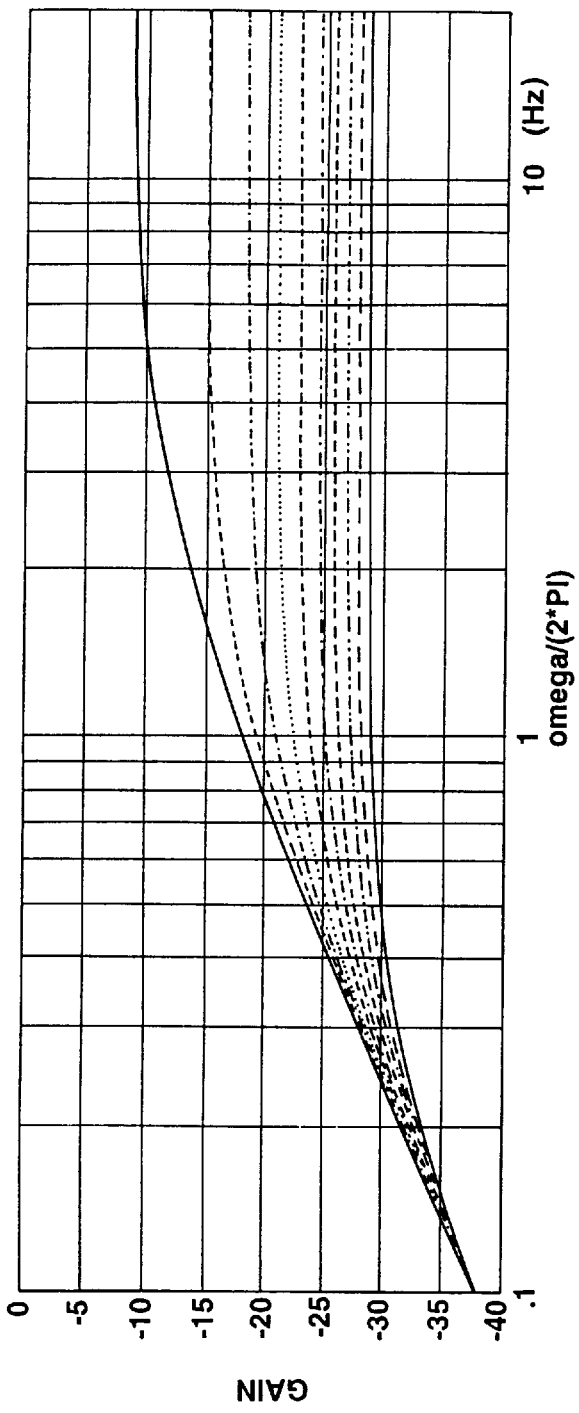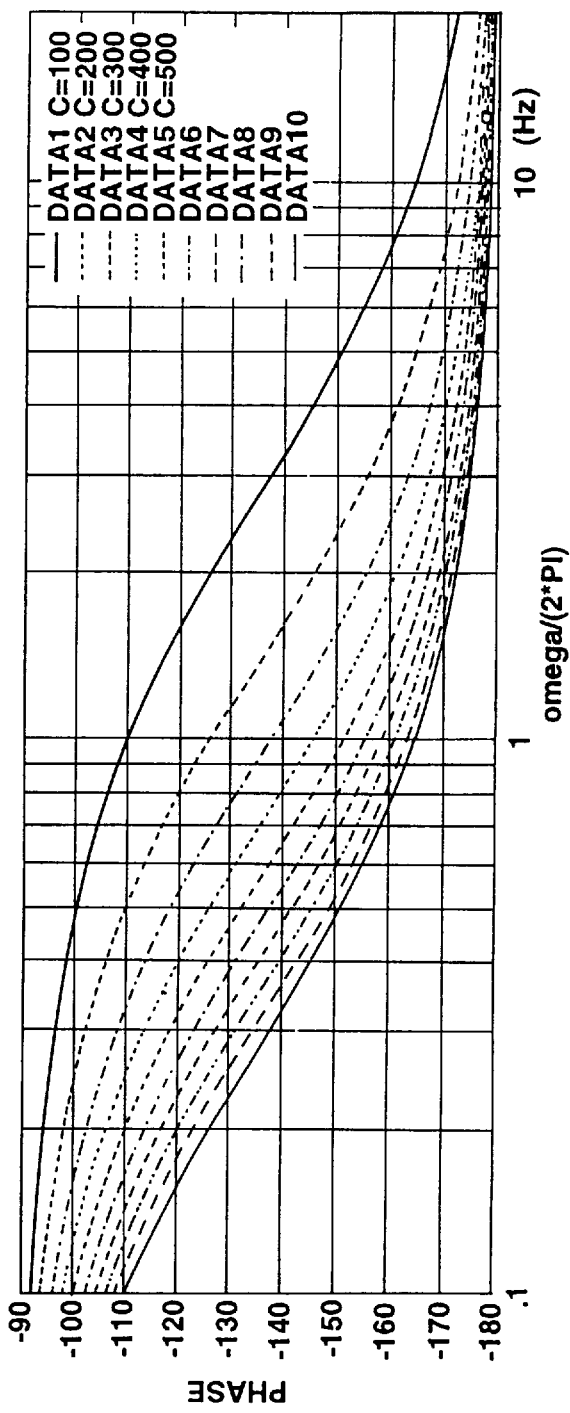
FIG.17A
FIG.17B

FIG.18A
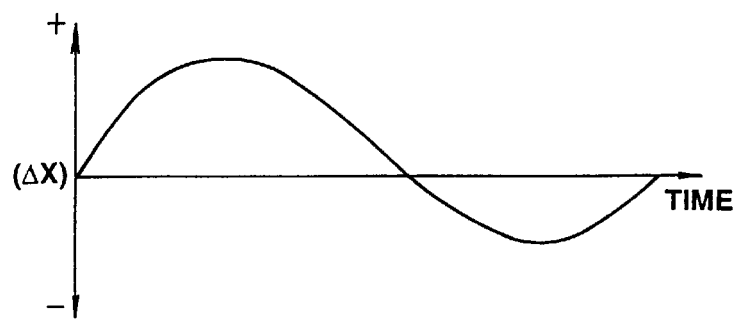
FIG.18B
FIG.18C
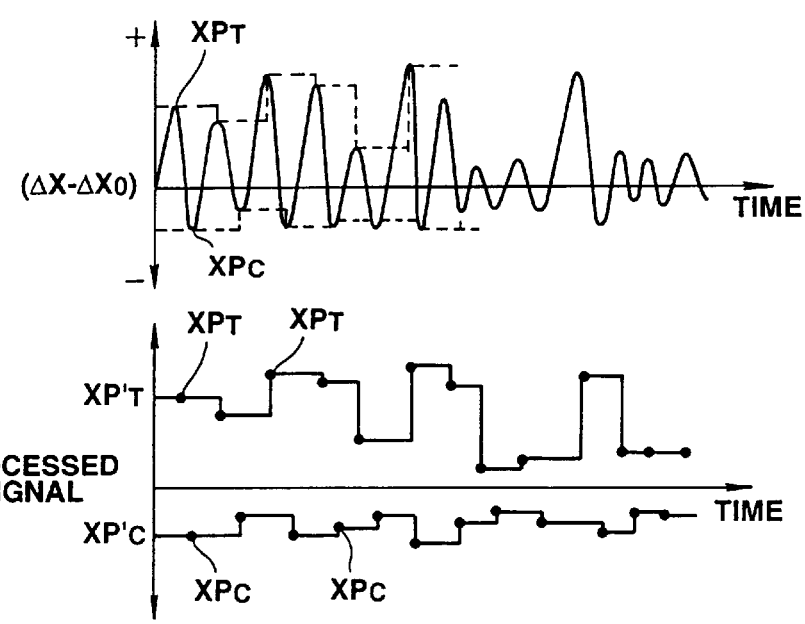
FIG.18D
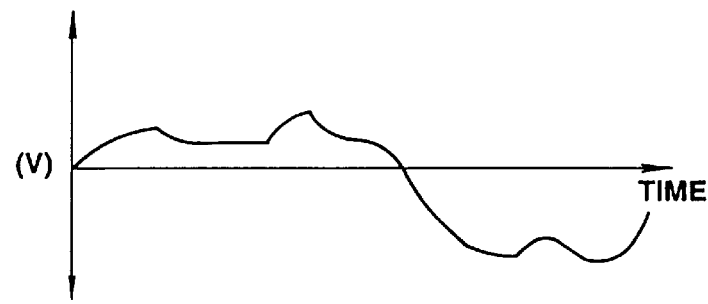
FIG.18E

ACTUAL SPRUNG
MASS ACCELERATION

ACTR TARGET AND
ACTUAL POSITIONS

ACTUAL SPRUNG
MASS ACCELERATION

ACTR TARGET AND
ACTUAL POSITIONS 5,890,081

AUTOMOTIVE VEHICLE SUSPENSION CONTROL SYSTEM

BACKGROUND OF THE INVENTION

This invention relates to a suspension control system for use with an automotive vehicle supported on front and rear pairs of road wheels to control the damping force characteristic of each of the shock absorbers interposed between a sprung mass (vehicle body) and an unsprung mass (corresponding one of the road wheels).

For example, Japanese Patent Kokai Nos. 61-163011 discloses an automotive vehicle suspension control system for controlling the damping force characteristics of the shock absorbers provided on an automotive vehicle. The conventional suspension control system is arranged to suppress vibrations on the vehicle body by controlling the shock absorber damping force characteristics toward the hard side when both of the sprung mass vertical velocity and the relative velocity between the sprung and unsprung masses have the same sign and to suppress the unsprung mass input to be transmitted to the sprung mass by controlling the shock absorber damping force characteristics toward the soft side when the sprung mass vertical velocity and the relative velocity between the sprung and unsprung masses have different signs. The sprung mass vertical velocity is derived from the sprung mass vertical acceleration sensed with the use of a vertical acceleration sensor mounted on the sprung mass (vehicle body), and the relative velocity is derived from the relative displacement sensed by a stroke sensor. Thus, the conventional suspension control system requires such a stroke sensor in addition to the vertical acceleration sensor, resulting in a complex and expensive suspension control system. Furthermore, the signal indicative of the derived relative velocity contains components of unsprung mass resonance frequency (10 to 15 Hz) and the resulting control signal used in operating the corresponding shock absorber is taken in the form of a high frequency signal with such a high frequency control signal, the shock absorber is required to be associated with a very expensive actuator operable in fast response to the control signal.

SUMMARY OF THE INVENTION

It is a main object of the invention to provide an improved automotive vehicle suspension control system which can ensure good shock absorber damping force characteristic control with the use of inexpensive actuators operable in relatively slow response to operate the shock absorbers.

There is provided, in accordance with the invention, a suspension control system for use with an automotive vehicle supported on front-left and -right road wheels at front-left and -right road wheel positions and also on rear-left and -right road wheels at rear-left and -right road wheel positions. The suspension control system comprises shock absorbers provided between sprung and unsprung masses of the vehicle at the respective road wheel positions for providing variable damping force characteristics, at least one sensor means for sensing a sprung mass vertical behavior, means for calculating sprung mass vertical velocities at the respective road wheel positions based on the sensed sprung mass vertical behavior, means for calculating relative velocities between the sprung and unsprung masses at the respective road wheel positions based on the sensed sprung mass vertical behavior with the use of a predetermined transfer function including terms related to damping coefficients of the respective shock absorbers, and a control unit for producing control signals based on the calculated sprung mass vertical velocities and the calculated relative velocities to control the damping force characteristics of the respective shock absorbers. The control unit includes means for determining damping coefficients of the respective shock absorbers based on the corresponding control signals, and means for varying the terms related to the damping coefficients of the respective shock absorbers based on the determined damping coefficients.

BRIEF DESCRIPTION OF THE DRAWINGS

The invention will be described in greater detail by reference to the following description taken in connection with the accompanying drawings, in which:

FIGS. 14A to 14E are time charts used in explaining the operation of the control unit to control the damping force characteristics of the sock absorbers;

FIG. 17A is a graph showing the gain characteristic of the transfer function;

FIG. 17B is a graph showing the phase characteristic of the transfer function;

FIGS. 18A to 18E are time charts used in explaining the operation of the signal processing circuit used in the suspension control system of FIG. 1;

DETAILED DESCRIPTION OF THE INVENTION

Figure 1:
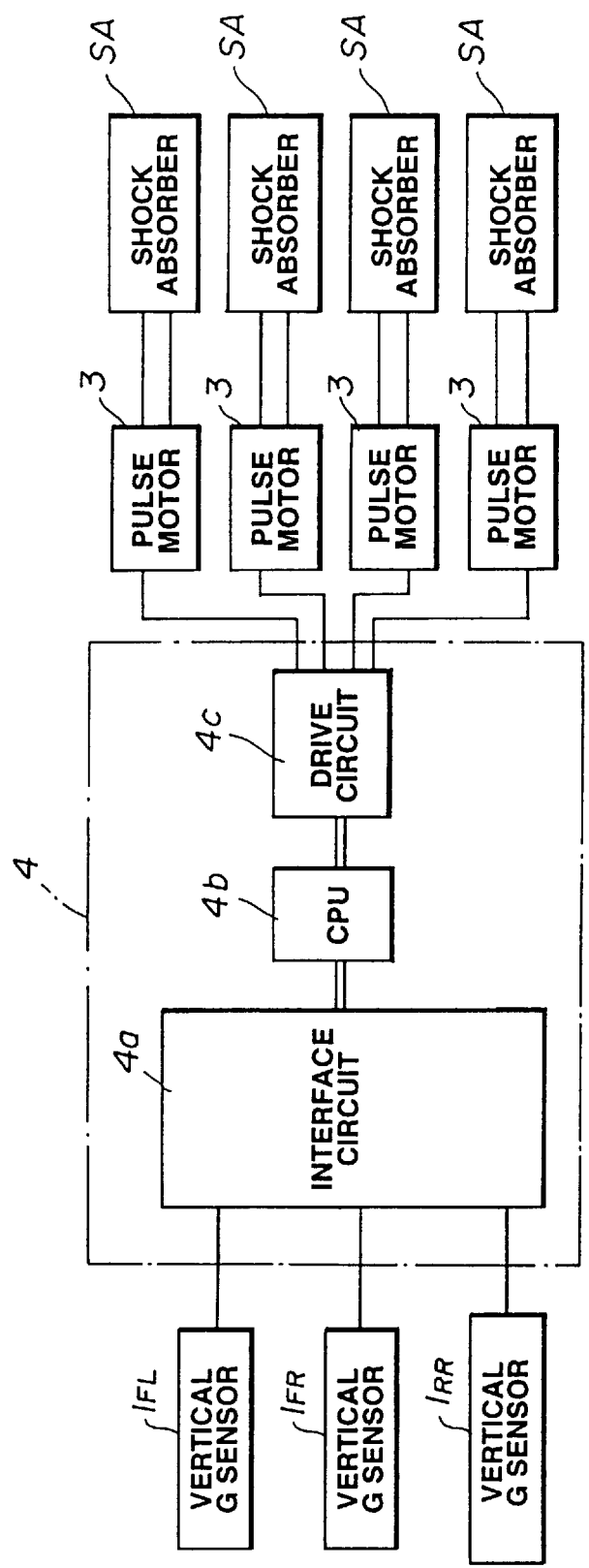
FIG. 1 is a schematic diagram showing one embodiment of an automotive vehicle suspension control system made in accordance with the invention.
Figure 2:
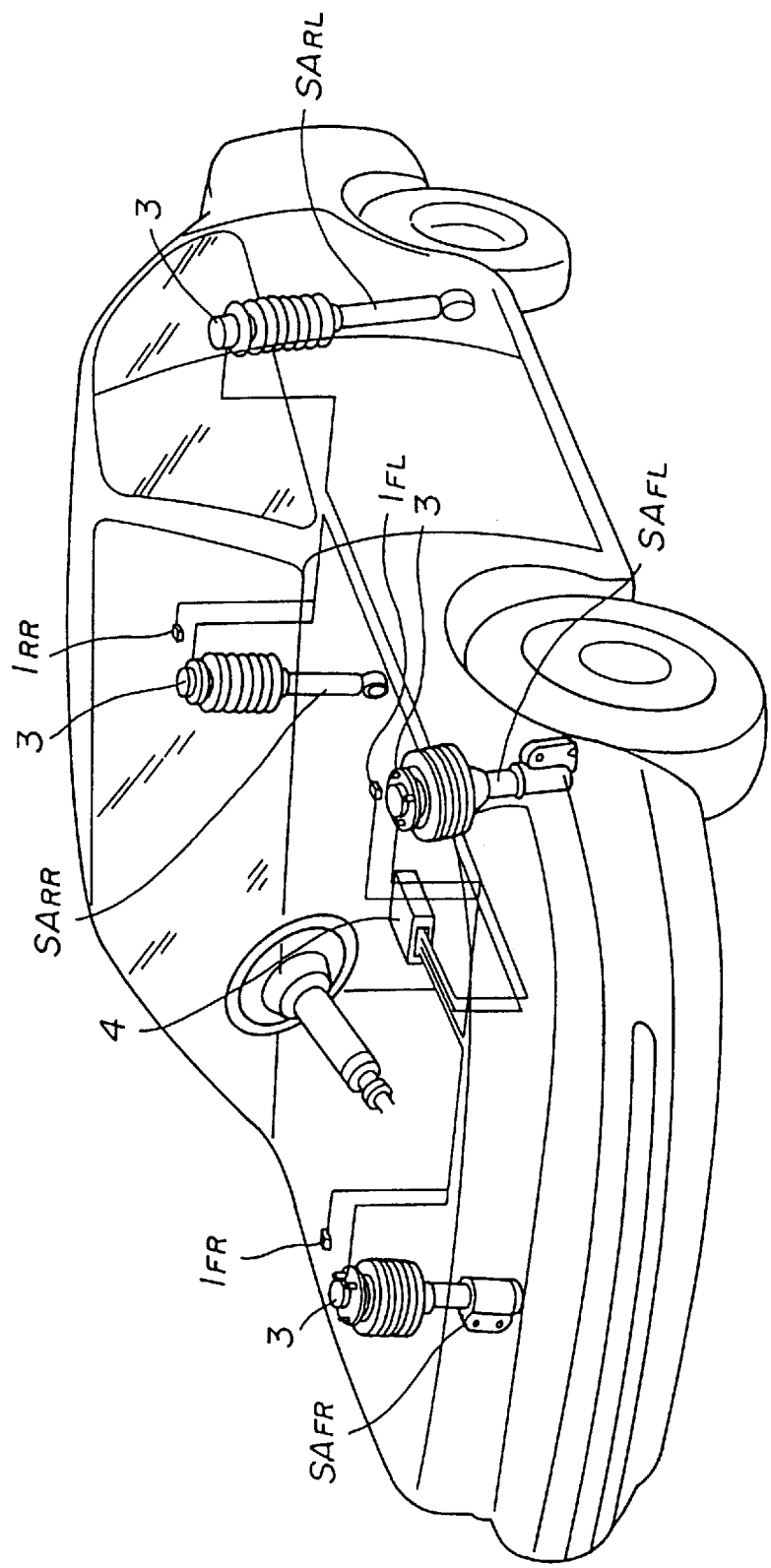
FIG. 2 is a perspective view showing shock absorbers used with the automotive vehicle.

With reference to the drawings, and in particular to FIG. 1, there is shown a schematic diagram of an automotive vehicle suspension control system embodying the invention. The suspension control system is shown as including a control unit 4 for driving pulse motors 3 in a manner to provide optimum damping force characteristics for shock absorbers SA. As best shown in FIG. 2, each of the four shock absorbers $SA_{FL}$, $SA_{FR}$, $SA_{RL}$ and $SA_{RR}$ is interposed between a sprung mass (vehicle body) and an unsprung mass (tire wheel). The control unit 4, which is mounted near the driver's seat (FIG. 2), includes an interface circuit 4a, a central processing unit (CPU) 4b, and a drive circuit 4c. The central processing unit 4b calculates desired damping force characteristics (in the form of damping coefficients) to be provided for the respective shock absorbers SA. These calculations are made based on signals fed thereto through the interface circuit 4a from various sensors including vertical G sensors $1_{FL}$, $1_{FR}$ and $1_{RR}$. The vertical G sensors $1_{FL}$, $1_{FR}$ and $1_{RR}$ are mounted on the vehicle body (sprung mass) near the positions (referred hereinafter as road wheel positions) at which the respective shock absorbers $SA_{FL}$, $SA_{FR}$ and $SA_{RR}$ are attached to the vehicle body, as shown in FIG. 2. The vertical G sensors $1_{FL}$, $1_{FR}$ and $1_{RR}$ sense the vertical accelerations G of the vehicle body (sprung mass) at the respective road wheel positions and produce sensor signals indicative of the sensed vertical accelerations $G_{FL}$, $G_{FR}$ and $G_{RR}$ to the interface circuit 4a. The central processing unit 4b transfers the control word specifying the calculated damping coefficient to the drive circuit 4c for producing a control signal V to drive a corresponding one of the step motors 3 to provide the calculated damping force characteristic.

Figure 3:
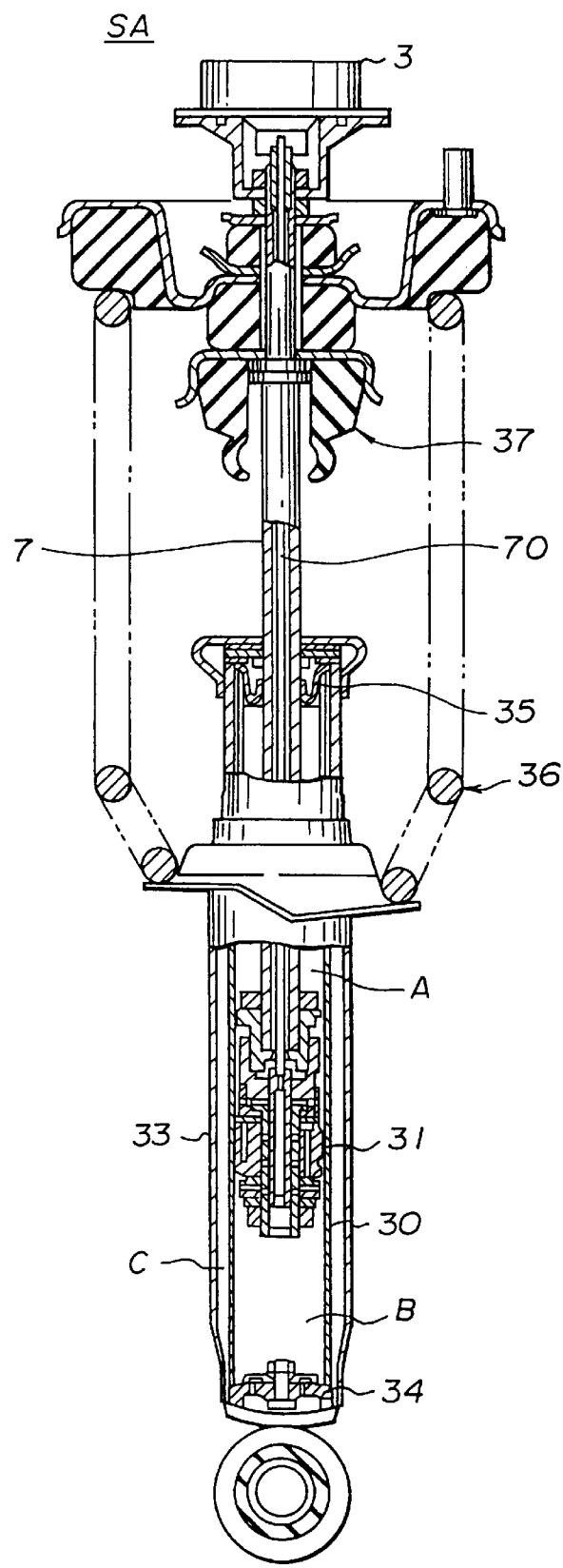
FIG. 3 is a sectional view showing the detailed structure of each of the shock absorbers.

Referring to FIG. 3, there is shown a variable damping force type shock absorber which may be used with the suspension control system. The shock absorber SA includes a cylinder 30 and a piston 31 mounted for reciprocal motion within the cylinder 30. The piston 31 defines upper and lower chambers A and B on the opposite sides thereof. An outer envelop 33 is placed to surround the cylinder 30 so as to define a reservoir C along therewith. A base 34 is provided to separate the reservoir C from the lower chamber B. A piston rod 7 is coupled to the piston 31 for sliding movement. The sliding movement of the piston rod 7 is guided by a guide member 35. A suspension spring 36 is seated between the outer envelop 33 and the vehicle body. The numeral 37 designates a bumper rubber member (or bushing).

Figure 4:
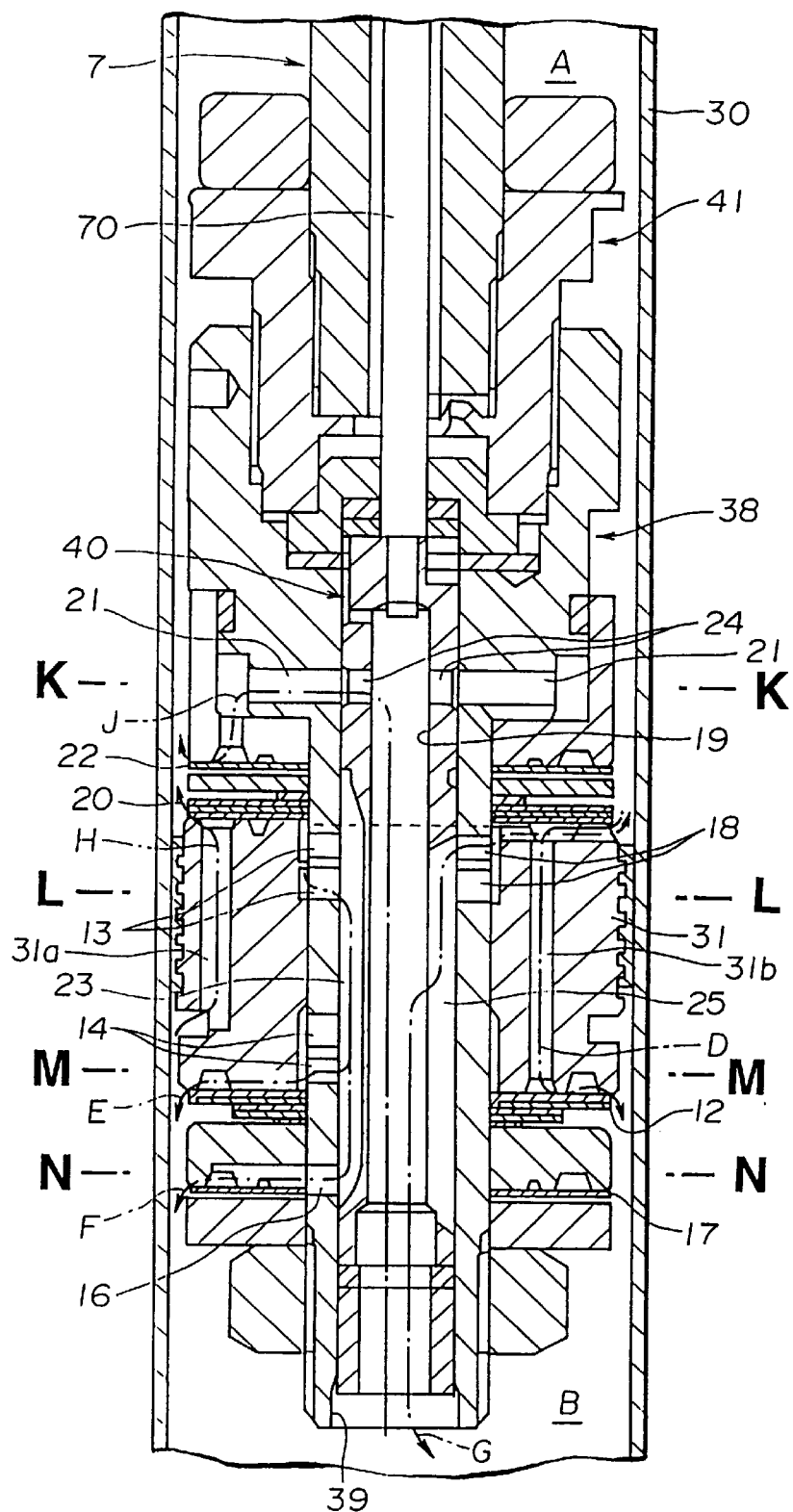
FIG. 4 is a fragmentary enlarged sectional view showing the significant portion of the shock absorber.

Referring to FIG. 4, the piston 31 has first and second passages 31a and 31b extending over the full length of the piston 31. A compression side damping valve 20 is provided in cooperation with the first passage 31a. An extension side damping valve 12 is provided in cooperation with the second passage 31b. the piston rod 7 is threadedly engaged at its tip end with a bound stopper 41. The bound stopper 41 is threadedly engaged within a stud 38 extending through the piston 31. The stud 38 is formed with a flow passage 39 bypassing the first and second passages 31a and 31b to form a passage (passages E, F, G and J) connected between the upper and lower chambers A and B. Provided in cooperation of the flow passage 39 are an adjuster 40, an extension side check valve 17 and a compression side check valve 22. The adjuster 40 is drivingly associated with the corresponding one of the pulse motors 3 which rotates the adjuster through a control rod 70 (FIG. 3) to adjust the effective area of the flow passage 39. The stud 38 is formed with first, second, third, fourth and fifth ports 21, 12, 18, 14 and 16 in a descending scale. The adjuster 40 has a hollow portion 19, first and second lateral holes 24 and 25, and a longitudinal groove 23 formed in its outer peripheral surface. In this structure, thus, four flow passages are formed for connection between the upper and lower chambers A and B during extension stroke (or phase). These flow passages include an extension side first flow passage D extending from the second passage 31b through the inner side of the extension side damping valve 12 to the lower chamber B, an extension side second flow passage E extending from the second port 13 through the longitudinal groove 23 to the fourth port 14 and hence through the outer peripheral side of the extension side damping valve 12 to the lower chamber B, an extension side third flow passage F extending from the second port through the longitudinal groove 23 to the fifth port 16 and hence through the extension side check valve 17 to the lower chamber B, and a bypass passage G extending from the third port 18 through the second lateral hole 25 and the hollow portion 19 to the lower chamber B. Furthermore, three flow passages are formed for connection between the upper and lower chambers A and B during compression stroke. These flow passages include a compression side first flow passage H extending from the first passage 31a through the compression side damping valve 20, a compression side second flow passage J extending from the hollow portion 19 through the first lateral hole 24 to the first port 21 and hence through the compression side check valve 22 to the upper chamber A, and a bypass passage G extending from the hollow portion 19 through the second lateral hole 25 and the third port 18 to the upper chamber A.

Figure 5:
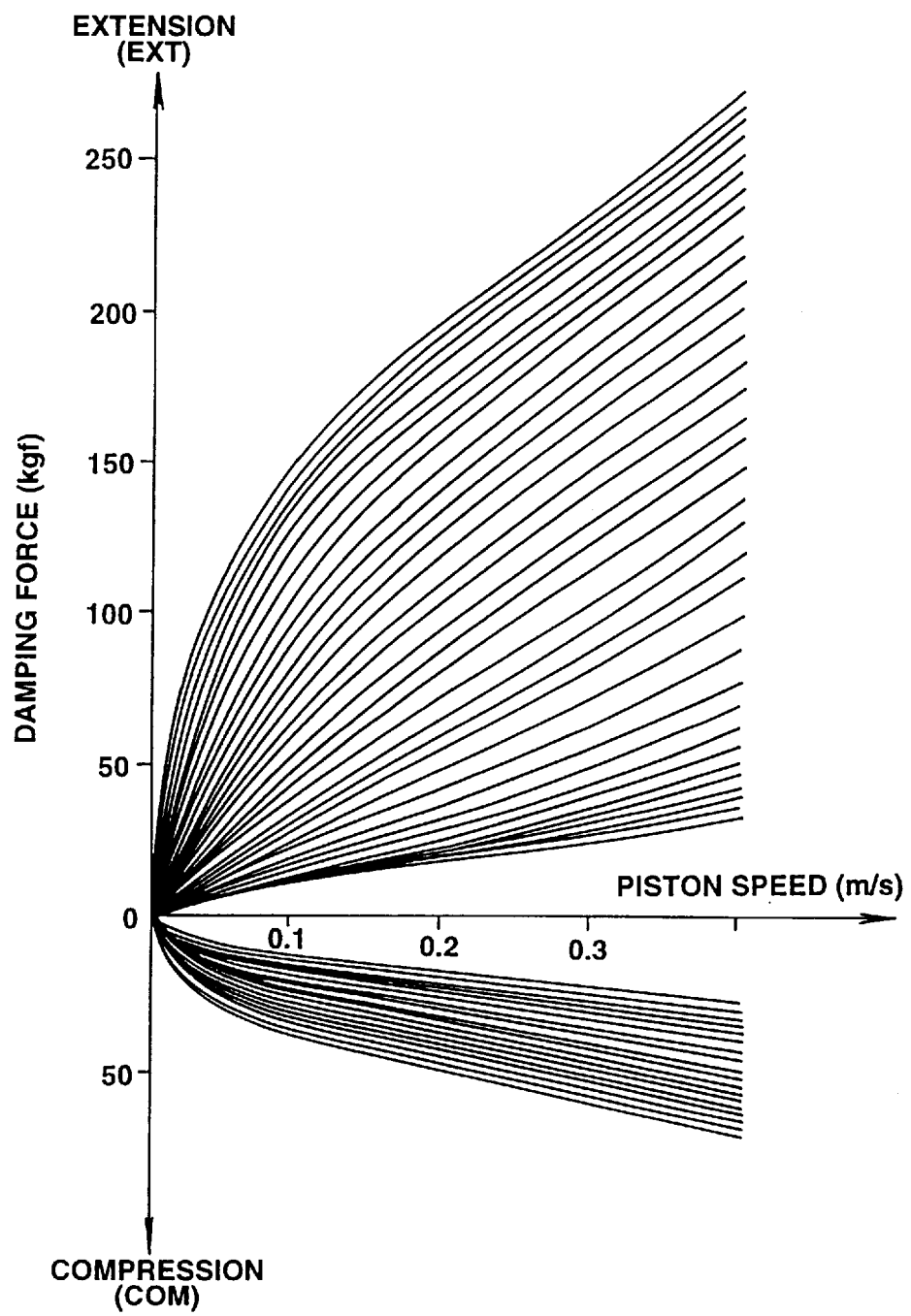
FIG. 5 is a graph of damping force versus piston speed.
Figure 6:
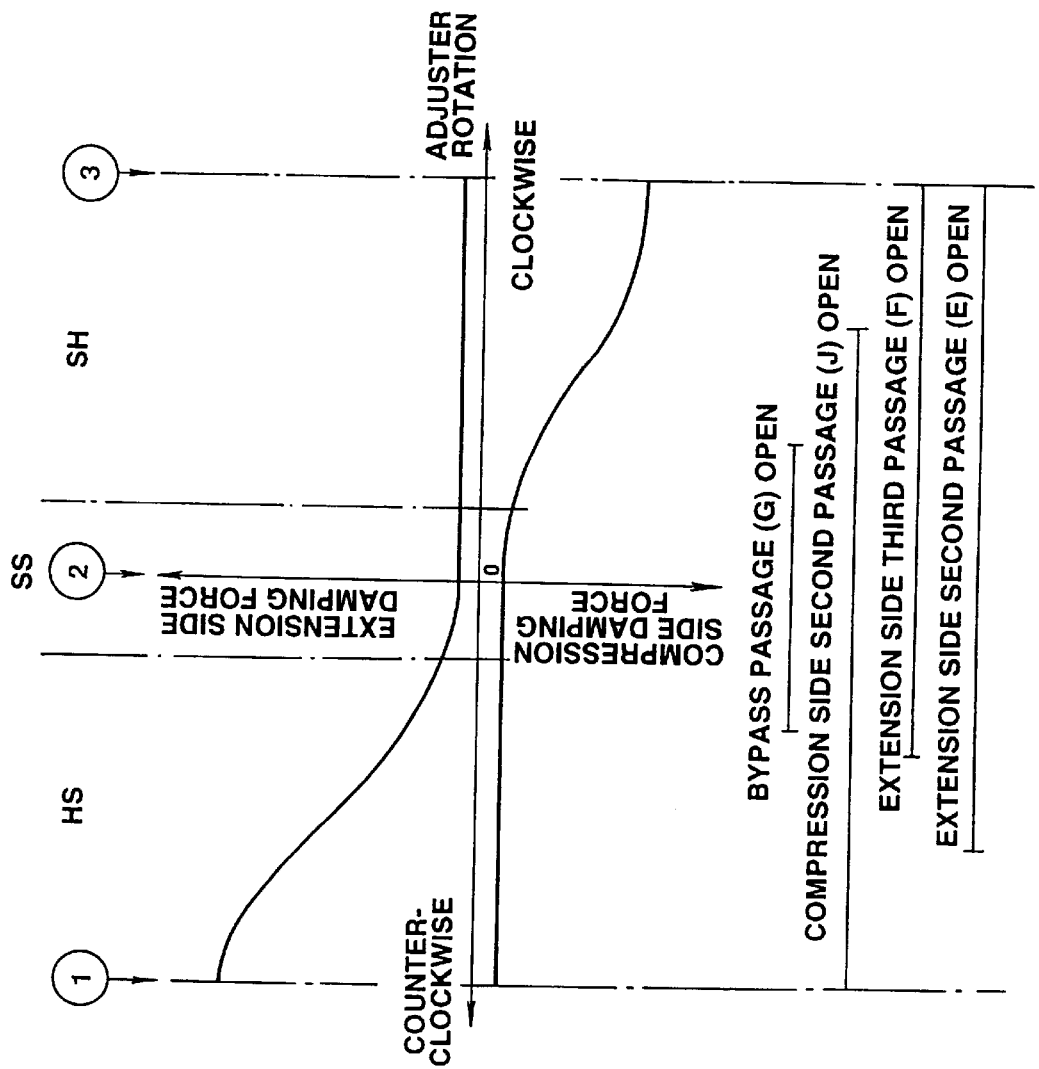
FIG. 6 is a diagram used in explaining the control ranges in which the shock absorber is operable with rotation of the adjuster placed in the shock absorber.
Figure 7A:
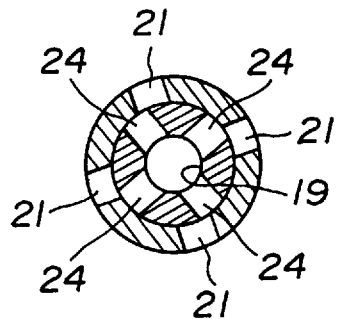
FIG. 7A is a cross-sectional view taken along the line K—K of FIG. 4 in the first position of the adjuster.
Figure 7B:
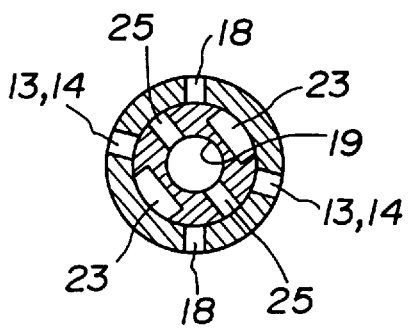
FIG. 7B is a cross-sectional view taken along the lines L—L and M—M of FIG. 4 in the first position of the adjuster.
Figure 7C:
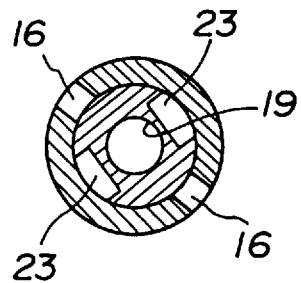
FIG. 7C is a cross-sectional view taken along the line N—N of FIG. 4 in the first position of the adjuster.
Figure 8A:
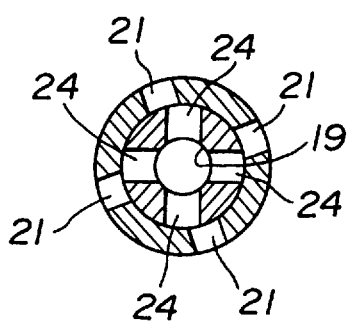
FIG. 8A is a cross-sectional view taken along the line K—K of FIG. 4 in the second position of the adjuster.
Figure 8B:
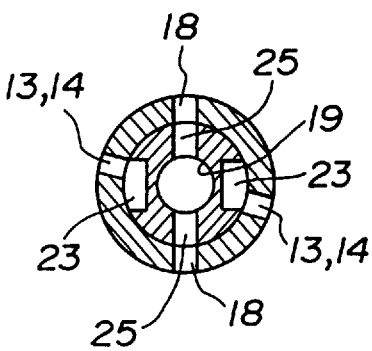
FIG. 8B is a cross-sectional view taken along the lines L—L and M—M of FIG. 4 in the second position of the adjuster.
Figure 8C:
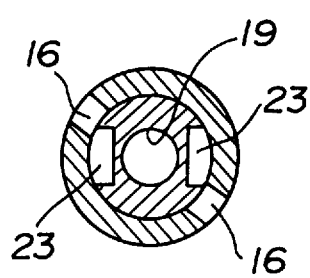
FIG. 8C is a cross-sectional view taken along the line N—N of FIG. 4 in the second position of the adjuster.
Figure 9A:
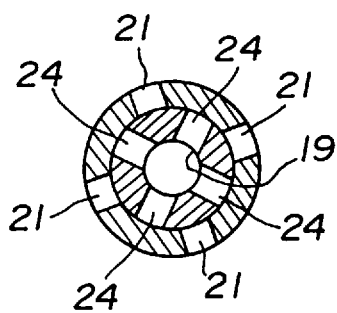
FIG. 9A is a cross-sectional view taken along the line K—K of FIG. 4 in the third position of the adjuster.
Figure 9B:
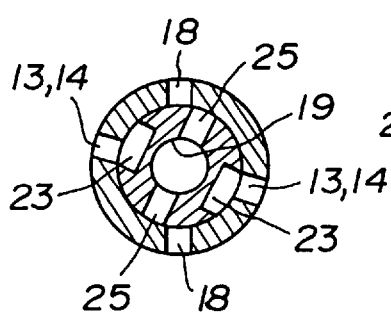
FIG. 9B is a cross-sectional view taken along the lines L—L and M—M of FIG. 4 in the third position of the adjuster.
Figure 9C:
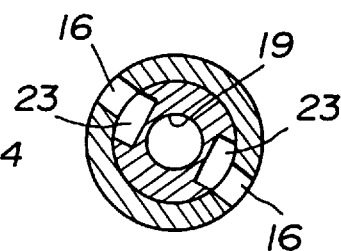
FIG. 9C is a cross-sectional view taken along the line N—N of FIG. 4 in the third position of the adjuster.
Figure 10:
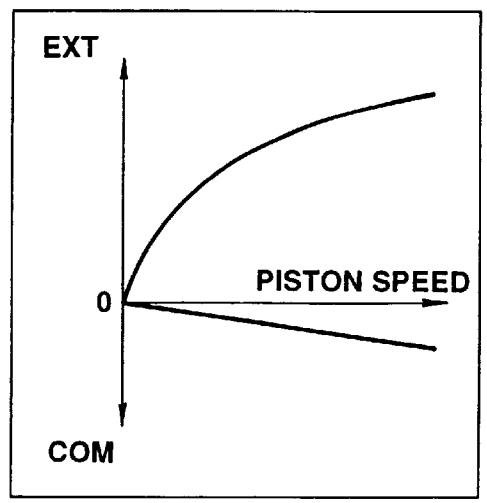
FIG. 10 is a diagram used in explaining the damping force characteristic in the first position of the adjuster.
Figure 11:
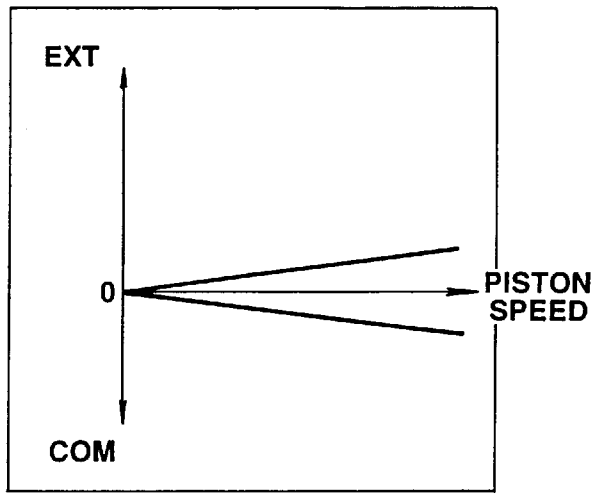
FIG. 11 is a diagram used in explaining the damping force characteristic in the second position of the adjuster.
Figure 12:
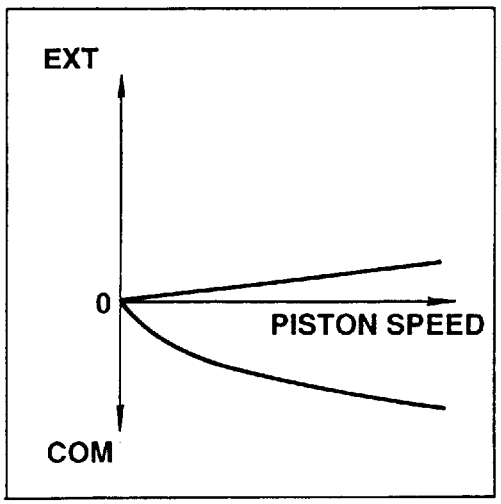
FIG. 12 is a diagram used in explaining the damping force characteristic in the third position of the adjuster.

The adjuster 40 can be rotated to adjust the damping force characteristics of the shock absorber SA in a plurality of steps on both of the extension and compression sides, as shown in FIG. 5. It is now assumed that the adjuster 40 is at a second position ② corresponding to a soft range SS. as shown in FIG. 6, where the shock absorber SA has a soft damping force characteristic on both of the extension and compression sides thereof. This damping force characteristic is shown in FIG. 11. In the second position ②, the components of the piston 31 are positioned as shown in FIGS. 8A, 8B and 8C. FIG. 8A is a cross-sectional view taken along the line K—K of FIG. 4, FIG. 8B is a cross-sectional view taken along the lines L—L and M—M of FIG. 4, and FIG. 8C is a cross sectional view taken along the line N—N of FIG. 4. When the adjuster 40 rotates in a counter-clockwise direction from the second position ②, the damping force characteristic of the shock absorber SA changes toward its hard characteristic side in a plurality of steps only on the extension side thereof. Eventually, the adjuster 40 comes to a first position ① corresponding to an extension side hard range HS, as shown in FIG. 6, where the shock absorber SA has a fixed soft characteristic on the compression side thereof. This damping force characteristic is shown in FIG. 10. In the first position ①, the components of the piston 31 are positioned as shown in FIGS. 7A, 7B and 7C. FIG. 7A is a cross-sectional view taken along the line K—K of FIG. 4, FIG. 7B is a cross-sectional view taken along the lines L—L and M—M of FIG. 4, and FIG. 7C is a cross-sectional view taken along the line N—N of FIG. 4. When the adjuster 40 rotates in the clockwise direction from the second position ②, the damping force characteristic of the shock absorber SA changes toward its hard characteristic side in a plurality of steps only on the compression side thereof. Eventually, the adjuster 40 comes to a third position ③ corresponding to a compression side hard range SH, as sown in FIG. 6, where the shock absorber SA has a fixed soft characteristic on the extension side thereof. This damping force characteristic is shown in FIG. 12. In the third position ③, the components of the piston 31 are positioned as shown in FIGS. 9A, 9B and 9C. FIG. 9A is a cross-sectional view taken along the line K—K of FIG. 4, FIG. 9B is a cross-sectional view taken along the lines L—L and M—M of FIG. 4, and FIG. 9C is a cross-sectional view taken along the line N—N of FIG. 4.

Figure 13:
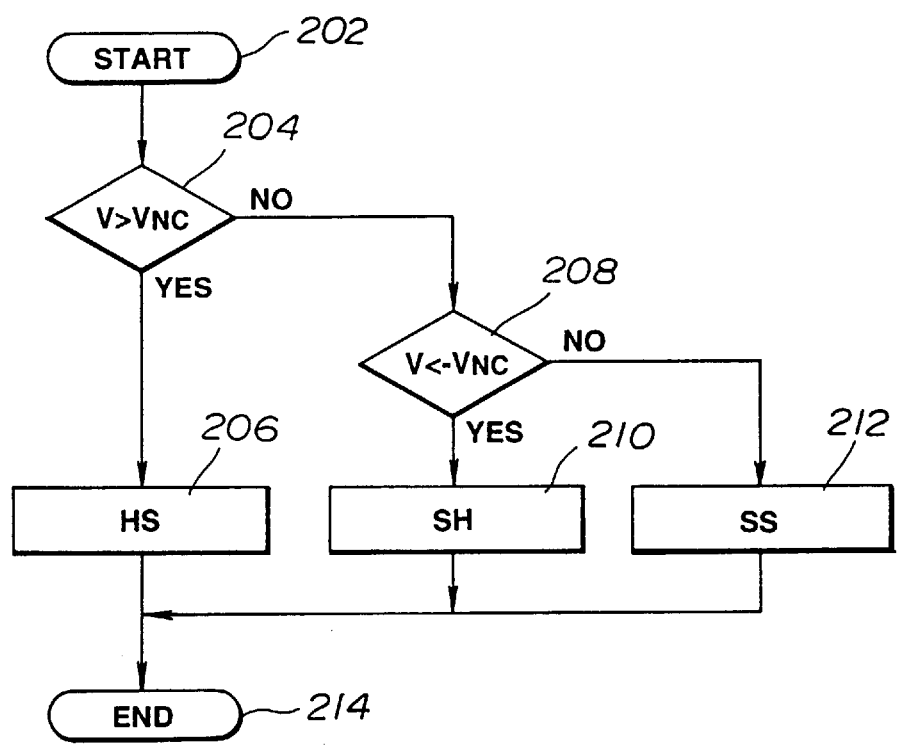
FIG. 13 is a flow diagram used in explaining the operation of the control unit to control the damping force characteristics of the shock absorbers.

FIG. 13 is a flow diagram illustrating the programming of the digital computer as it is used to control the damping force characteristic of each of the shock absorbers SA. The computer program is entered at the point 202. At the point 204 in the program, a determination is made as to whether or not the control signal V is greater than the upper limit $V_{NC}$ of a dead zone. If the answer to this question is "yes", then the program proceeds to the point 206 where a command is produced to operate the shock absorber in the extension phase hard range HS and then to the end point 214. Otherwise, the program proceeds to another determination step at the point 208. this determination is as to whether or not the control signal V is less than the lower limit $-V_{NC}$ of the dead zone. If the answer to this question is "yes", then the program proceeds to the point 210 where a command is produced to operate the shock absorber in the compression phase hard range SH and then to the end point 214. Otherwise, it means that the control signal V is in the dead zone and the program proceeds to the point 212 where a command is produced to operate the shock absorber in the soft range SS. Following this, the program proceeds to the end point 214.

Referring to FIGS. 14A to 14E, the shock absorber damping force characteristic control will be described further. It is now assumed that control signal V produced based on the sprung mass vertical velocity $\Delta x$ and the relative velocity $(\Delta x - \Delta x_0)$ changes with time as shown in FIG. 14A. When the control signal V is in the dead zone defined between its upper and lower limits $V_{NC}$ and $-V_{NC}$, the shock absorber is controlled to have a damping force characteristic placed in the soft range SS where both of the extension and compression phases exhibit predetermined fixed low damping force characteristics. When the control signal V increases above the upper limit $V_{NC}$, the damping force characteristic of the shock absorber is controlled in the extension phase hard range HS where the compression phase is fixed at a predetermined low (soft) damping force characteristic. The extension phase damping force characteristic (target damping force characteristic position $P_T$=damping coefficient C) is changed in direct proportion to the control signal V to be described later. When the control signal V decreases below the lower limit $-V_{NC}$, the damping force characteristic of the shock absorber is controlled in the compression phase hard range SH to provide a predetermined low (soft) damping force characteristic in the extension phase and the compression phase damping force characteristic (target damping force characteristic position $P_C$=damping coefficient C) is varied in direct proportion to the control signal v to be described later.

In FIG. 14C, the character a designates a control range where the control signal V produced based on the sprung mass vertical velocity $\Delta x$ and the relative velocity $(\Delta x - \Delta x_0)$ changes from its negative sign (downward) to its positive sign (upward). Since the relative velocity $(\Delta x - \Delta x_0)$ remains negative (the shock absorber operates in the compression phase), the shock absorber is controlled in the extension phase hard range HS according to the sign (direction) of the control signal V. In the control range a, thus, the shock absorber is controlled to provide a soft characteristic in the compression phase.

In the control range b where sign of the control signal V remains positive (upward) and the relative velocity $(\Delta x - \Delta x_0)$ changes from its negative sign to its positive sign indicating the extension phase (EXT) of the shock absorber, the shock absorber is controlled in the extension phase hard range HS according to the sign (direction) of the control signal V and the shock absorber is in the extension phase. In this control range, thus, the shock absorber is controlled to have a hard characteristic in direct proportion to the sprung mass vertical velocity $\Delta x$ in the extension phase corresponding to the present phase of the shock absorber.

In the control range c where the sprung mass vertical velocity $\Delta x$ changes from its positive sign (upward) to its negative sign (downward) with the relative velocity $(\Delta x - \Delta x_0)$ having a positive sign indicating the extension phase (EXT) of the shock absorber, the shock absorber is controlled in the compression phase hard range SH according to the sign of the sprung mass vertical velocity $\Delta x$. In this control range, thus, the shock absorber is controlled to have a soft characteristic in the extension phase corresponding to the present phase of the shock absorber.

In the control range d where the sign of the sprung mass vertical velocity $\Delta x$ remains negative (downward) and the relative velocity $(\Delta x - \Delta x_0)$ changes from its positive sign to its negative sign indicating the extension phase (EXT) of the shock absorber, the shock absorber is controlled in the compression phase hard range SH based on the sign of the sprung mass vertical velocity $\Delta x$. In this control range, thus, the shock absorber is controlled to have a hard characteristic in the compression phase corresponding to the present phase of the shock absorber.

In this embodiment, the shock absorber is controlled to provide a hard characteristic in the present phase of the shock absorber when the sign of the control signal V produced based on the sprung mass vertical velocity $\Delta x$ and the relative velocity $(\Delta x - \Delta x_0)$ and the sign of the relative velocity $(\Delta x - \Delta x_0)$ are the same (control ranges b and d) and to provide a soft characteristic in the present phase of the shock absorber when the signs of the control signal A and the relative velocity ($\Delta x - \Delta x_0$) are different (control ranges a and c). It is, therefore, possible to perform the same control as the damping force characteristic control made according to the sky hook theory. Furthermore, the damping force characteristic position has been switched to the hard characteristic side in the previous control ranges a and c at the time when the phase of the shock absorber is switched, that is, in response to a change from the control range a to the control range b and also to a change from the control range c to the control range d (from the soft characteristic to the hard characteristic). It is, therefore, possible to make a change from the soft characteristic to the hard characteristic with no delay in time. This is effective to provide a very fast control response.

Figure 15:
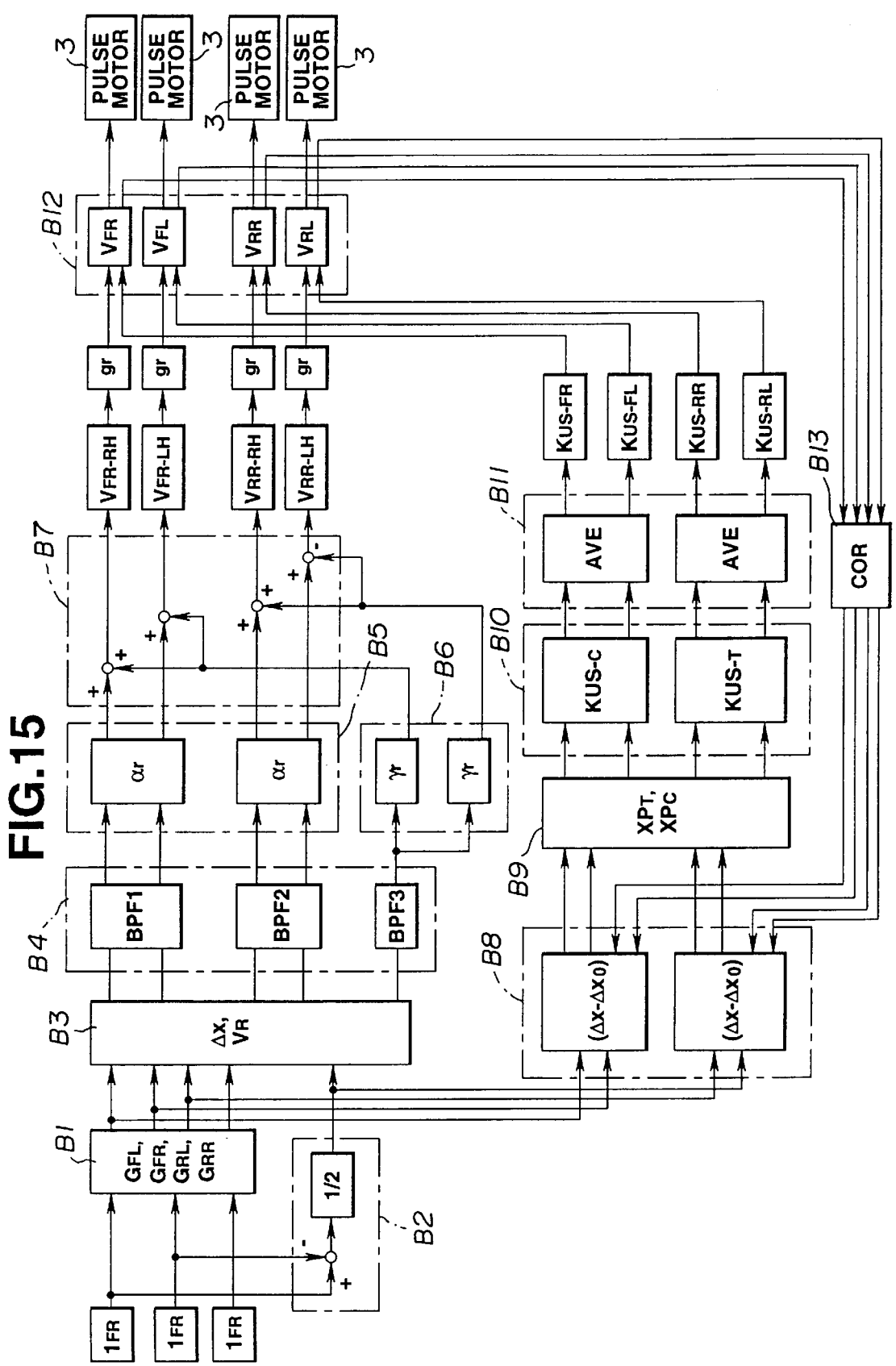
FIG. 15 is a block diagram showing a signal processing circuit used in the suspension control system of FIG. 1.

Referring to FIG. 15, there is shown a signal processing circuit included in the control unit 4 for producing the control signals V to drive the respective pulse motors 3. This signal processing circuit includes thirteen blocks B1 to B13. The first block B1 receives sensor signals indicative of the vertical accelerations sensed at the front-left, front-right and rear-right road wheel positions fed thereto from the front-left, front-right and rear-right vertical G sensors 1FL, 1FR and 1RR and it calculates vertical accelerations GFL, GFR, GRL and GRR at the respective road wheel positions. The second block B2 receives-sensor signals indicative of the vertical accelerations sensed at the front-left and -right road wheel positions fed thereto from the front-left and -right vertical G sensors 1FL and 1FR and it calculates a vehicle roll acceleration GR from the following equation:

$$G_R = (G_{FR} - G_{FL})/2 \tag{1}$$

The third block B3 receives the calculated vertical accelerations GFL, GFR, GRL and GRR transferred thereto from the first block B1 and the calculated vehicle roll acceleration GR transferred thereto from the second block B2 and it calculates sprung mass velocities $\Delta x$ ($\Delta xFL$, $\Delta xFR$, $\Delta xRL$, $\Delta xRR$) and a vehicle roll velocity VR. These calculations may be made by the integration of the transferred signals or the passage of the transferred signals through low pass filters. The fourth block B4 includes band pass filters BPF1, BPF2 and BPF3 for removing signal components except for the components required for the shock absorber damping characteristic control. The band pass filters BPF1 and BPF2 are provided to obtain vehicle bounce velocity signals VBFR, VBFL, VBRR and VBRL in the vehicle bounce resonance frequency band and the band pass filter BPF3 is provided to obtain the roll velocity signal VR in the vehicle roll resonance frequency band. The fifth block B5 sets bounce coefficients $\alpha_f$ and $\alpha_r$ independently for the front and rear road wheels in order to deal with the difference between the behaviors resulting from the difference between the magnitudes of the parameter (for example, weight, spring constant or the like) of the vehicle front and rear wheels. The sixth block B6 sets roll coefficient $r_f$ and $r_r$ independently for the front and rear road wheels in order to prevent shortage of the control force with respect to the behavior in the roll direction resulting from an external force (lateral acceleration) acting on the vehicle body when the steering wheel is turned. The seventh block B7 calculates the sprung mass component signals VU (VFR-RH, VFR-LH, VRR-RH and VRR-LH), for the front-right, front-left, rear-right and rear-light road wheels, respectively, from the following equations:

$$V_{FR-RH} = \alpha_f \cdot V_{BFR} + r_f \cdot V_R \tag{2}$$

$$V_{FR-LH} = \alpha_f \cdot V_{BFL} + r_f \cdot V_R \tag{3}$$

$$V_{RR-RH} = \alpha_r \cdot V_{BRR} + r_r \cdot V_R \tag{4}$$

$$V_{RR-LH} = \alpha_r \cdot V_{BRL} + r_r \cdot V_R \tag{5}$$

Figure 16:
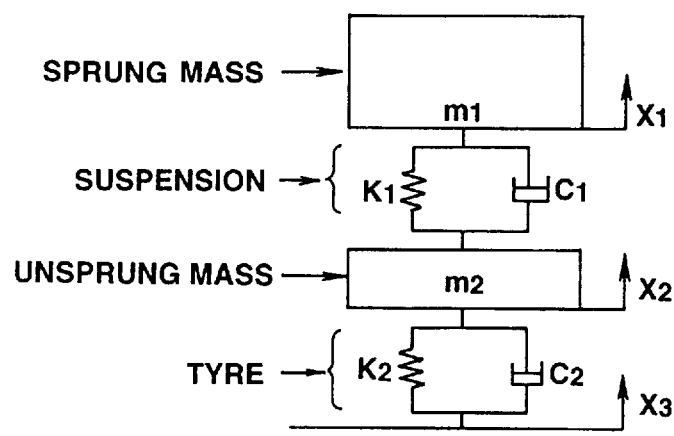
FIG. 16 is a schematic diagram showing a model used in calculating a transfer function.

The eight block B8 receives the vertical accelerations GFL, GFR, GRL and GRR transferred thereto from the first block B1 and it employs a transfer function GU(s) to calculate the relative velocities ($\Delta x - \Delta x_0$) [($\Delta x - \Delta x_0$)FL, ($\Delta x - \Delta x_0$)FR, ($\Delta x - \Delta x_0$)RL, ($\Delta x - \Delta x_0$)RR] between the sprung and unsprung masses from the following equation:

$$G_U(s) = RS/(DS + E) \tag{6}$$

where $R = -m_1$, $D = c_1$ and $E = k_1$. A model used in calculating the transfer function will be apparent from FIG. 16 where $x_1$ is the sprung mass input, $x_2$ is the unsprung mass input, $X_3$ is the road surface input, $m_1$ is the sprung mass, $m_2$ is the unsprung mass, $c_1$ is the suspension damping coefficient, $c_2$ is the tyre damping coefficient, $k_1$ is the spring constant of the suspension, and $k_2$ is the spring constant of the tire. The target damping force characteristic positions P (or the control damping coefficients C) of the respective shock absorbers SA calculated at the twelfth block B12 are fed back through the thirteenth block B13 to be described later. The eighth block B8 employs the damping coefficients C transferred thereto from the thirteenth block B13 in the term of $C_1$ of Equation (6). FIGS. 17A and 17B shows the gain and phase characteristics of the transfer function GU(s) used in Equation (6) for calculating the relative velocities ($\Delta x - \Delta x_0$). As shown in FIGS. 17A and 17B, the characteristics are different for the suspension damping coefficient differences (DATA 1-10). It is possible to correct the characteristic difference by feedback of the control damping coefficients C of the respective shock absorbers SA. This is effective to obtain accurate relative velocity ($\Delta x - \Delta x_0$) signals with the use of the sprung mass vertical G sensors 1 only.

The ninth block B9 receives the calculated relative velocities ($\Delta x - \Delta x_0$) and detects the extension and compression side peak values XPT and XPC of the relative velocities ($\Delta x - \Delta x_0$) according to the sign (positive on the extension side and negative on the compression side) indicating the direction of the relative velocities ($\Delta x - \Delta x_0$), as shown in FIG. 18C. The detected peak values XPT and XPC are stored as XP'T and XP'C. When a new peak value XPT or XPC is detected, it is used to update the corresponding peak value XP'T or XP'C. The tenth block B10 receives the peak values XP'T and XP'C and produces extension side reprocessed signals KUS-T (KUS-FR-T, KUS-FL-T, KUS-RR-T, KUS-RL-T) and compression side reprocessed signals KUS-C (KUS-FR-C, KUS-FL-C, KUS-RR-C, KUS-RL-C) inversely proportional to the extension and compression side processed signals XP'T and XP'C, respectively. That is, the tenth block B10 calculates the extension and compression side reprocessed signals KUS-T and KUS-C from the following equations:

$$\text{KUS-T} = 1/\text{XP'T} \tag{7}$$

$$\text{KUS-C} = 1/\text{XP'C} \tag{8}$$

The extension and compression side reprocessed signals KUS-T and KUS-C are set at their maximum values (KUS-T, KUS-C=MAX (1.0, 0.9)) when the extension or compression side processed signal XP'T or XP'C is less than a predetermined minimum value MIN (XP7T, XP'C≦MIN). This means that the reprocessed signals KUS-T and KUS-C are prevented from diverging to infinity when the respective processed signals XP'T and XP'C come close to zero. The eleventh block B11 receives the extension side reprocessed signals KUS-T (KUS-FR-T, KUS-FL-T, KUS-RR-T, KUS-RL-T) and the compression side reprocessed signals KUS-C (KUS-FR-C, KUS-FL-C, KUS-RR-C, KUS-RL-C) and it produces extension side averaged signals KUS'-T (KUS'-FR-T, KUS'-FL-T, KUS'-RR-T, KUS'-RL-T) and compression side averaged signals KUS'-C (KUS'-FR-C, KUS'-FL-C, KUS'-RR-C, KUS'-RL-C) by averaging the extension and compression side reprocessed signals KUS-T (KUS-FR-T, KUS-FL-T, KUS-RR-T, KUS-RL-T) and KUS-C (KUS-FR-C, KUS-FL-C, KUS-RR-C, KUS-RL-C), respectively.

The twelfth block B12 receives the sprung mass component signals Vu produced based, on the sprung mass velocities $\Delta x$ and the averaged signals KUS-T and KUS-C produced based on the relative velocities ($\Delta x - \Delta x_0$) and it calculates control signals V in the form of extension side control signals V-FR-T, V-FL-T, V-RR-T and V-RL-T) and compression side control signals V-FR-C, V-FL-C, V-RR-C and V-RL-C from the following equations:

$$V_{\text{FR-T}} = g_f \cdot V_{\text{FR-RH}} \cdot KUS'\text{-FR-T} \quad (9a)$$

$$V_{\text{FR-C}} = g_f \cdot V_{\text{FR-RH}} \cdot KUS'\text{-FR-C} \quad (9b)$$

$$V_{\text{FL-T}} = g_f \cdot V_{\text{FR-LH}} \cdot KUS'\text{-FL-T} \quad (10a)$$

$$V_{\text{FL-C}} = g_f \cdot V_{\text{FR-LH}} \cdot KUS'\text{-FL-C} \quad (10b)$$

$$V_{\text{RR-T}} = g_r \cdot V_{\text{RR-RH}} \cdot KUS'\text{-RR-T} \quad (11a)$$

$$V_{\text{RR-C}} = g_r \cdot V_{\text{RR-RH}} \cdot KUS'\text{-RR-C} \quad (11b)$$

$$V_{\text{RL-T}} = g_r \cdot V_{\text{RR-LH}} \cdot KUS'\text{-RL-T} \quad (12a)$$

$$V_{\text{RL-C}} = g_r \cdot V_{\text{RR-LH}} \cdot KUS'\text{-RL-C} \quad (12b)$$

where $g_f$ is the extension side total gain and $g_r$ is the compression side total gain. The target damping force characteristic positions P (PT, PC), or the control damping coefficients C, of the respective shock absorbers SA are calculated based on the control signals V (V-FR-T, V-FL-T, V-RR-T, V-RL-T, V-FR-C, V-FL-C, V-RR-C and V-RL-C) from the following equation:

$$P = C = (V - V_{\text{NC}})/(V_H - V_{\text{NC}}) \cdot P_{\text{MAX}} \quad (13)$$

where PMAX is the maximum damping force characteristic position, VNC is the control dead zone and VH is the proportional range.

In this embodiment, it is possible to prevent the control signals from diverging to infinity by converting the extension and compression side processed signals XP'T and XP'C into corresponding extension and compression side reprocessed signals KUS-T and KUS-C inversely proportional to the extension and compression side processed signals XP'T and XP'C at the tenth block B10 and then multiplying them to the sprung mass vertical velocity signals V-RH. It is also possible to produce low-frequency extension and compression side processed signals XP'T and XP'C, as shown in FIG. 18C, so as to produce low-frequency control signals V, as shown in FIG. 18D, by detecting the peak values of the relative velocities ($\Delta x - \Delta x_0$) independently on the extension and compression sides at the ninth block B9 and employing either of the peak values XPT and XPC on the stroke side corresponding to the sign of the sprung mass velocities ax. It is also possible to further lower the frequency of the control signals V by averaging the extension and compression side reprocessed signals KUS-T and KUS-C at the eleventh block B11.

The production of the control signals V will be described further with reference to FIGS. 18A to 18E. It is now assumed that the sprung mass velocity $\Delta x$ changes in a low frequency fashion, as shown in FIG. 18A, and the relative velocity ($\Delta x - \Delta x_0$) changes in a high frequency fashion, as shown in FIG. 18B. The extension and compression side peak values XPT and XPC of the relative velocity ($\Delta x - \Delta x_0$) are detected, as indicated by the black points of FIG. 18C, and the extension and compression side peak values XPT and XPC of the relative velocity ($\Delta x - \Delta x_0$) are held until a new peak value is detected for each of the extension and compression side peak values XPT and XPC, as indicated by the solid lines of FIG. 18C. Therefore, the high-frequency relative velocity signal ($\Delta x - \Delta x_0$) can be modified into low-frequency extension and compression side processed signals XPT and XPC. As can be seen from Equations (9a) to (12a) and Equations (9b to 12b), thus, the control signal V calculated based on the low-frequency signals has a low frequency waveform, as shown in FIG. 18D. It is, therefore, possible to switch the damping force characteristic positions in fast response to changes in the control signal V, as shown in FIG. 18E, even though the pulse motor 3 has a slow response.

The operation will be described further with reference to FIGS. 19A to 19C. In these figures, the solid lines relate to the control signal V' produced in the conventional control apparatus, the one-dotted lines relate to the damping force characteristic position P' obtained in the conventional control apparatus and the broken lines relate to the control signal V and damping force characteristic position P obtained in the control apparatus of the invention.

Figure 19A:
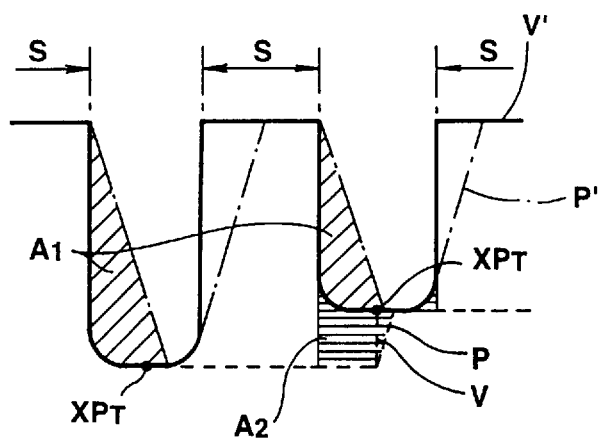
FIGS. 19A to 19C are time charts used in explaining the excessive and insufficient control forces in different cases.

FIG. 19A shows the case where the extension side peak value XPT of the relative velocity ($\Delta x - \Delta x_0$) changes to a smaller value. With the use of the control signal V varying in a high frequency fashion, the operation of the pulse motor 3 to switch the damping force characteristic position P' will lag somewhat behind the peak value change and fail to provide an ideal control force reduction. As a result, an excessive control force is produced in the ranges indicated by the hatched areas A1. With the control signal V produced according to the invention, an insufficient control force is produced in the range indicated by the hatched area A2.

Figure 19B:
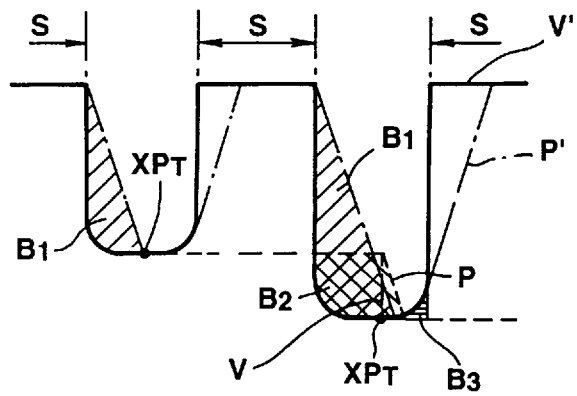

FIG. 19B shows the case where the extension side peak value XPT of the relative velocity ($\Delta x - \Delta x_0$) changes to a greater value. With the use of the control signal V varying in a high frequency fashion, the operation of the pulse motor 3 to switch the damping force characteristic position P' will lag somewhat behind the peak value change and fail to provide an ideal control force reduction. As a result, an excessive control force is produced in the ranges indicated by the hatched areas B1. With the control signal V produced according to the invention, an excessive control force is produced in the range indicated by the hatched area B2 and an insufficient control force is produced in the range indicated by the hatched area B3.

Figure 19C:
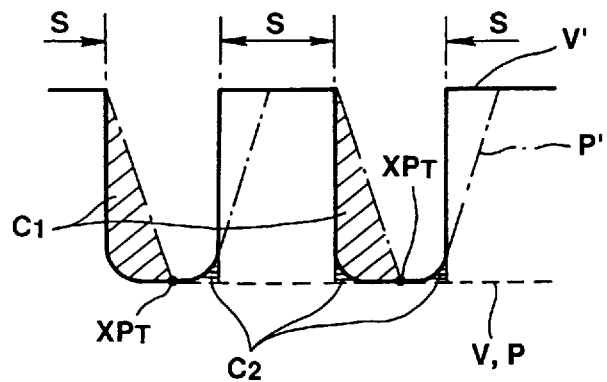

FIG. 19C shows the case where the extension side peak value XPT of the relative velocity ($\Delta x - \Delta x_0$) is unchanged. With the use of the control signal V varying in a high frequency fashion, an excessive control force is produced in the ranges indicated by the hatched areas C1. With the control signal V produced according to the invention, an insufficient control force is produced in the range indicated by the hatched area C2.

Figure 20A:
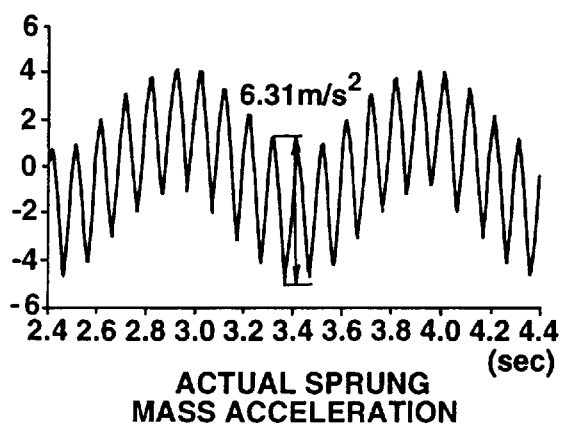
FIGS. 20A and 20B are time charts used in explaining the simulation results related to the suspension control system of the invention.
Figure 20B:
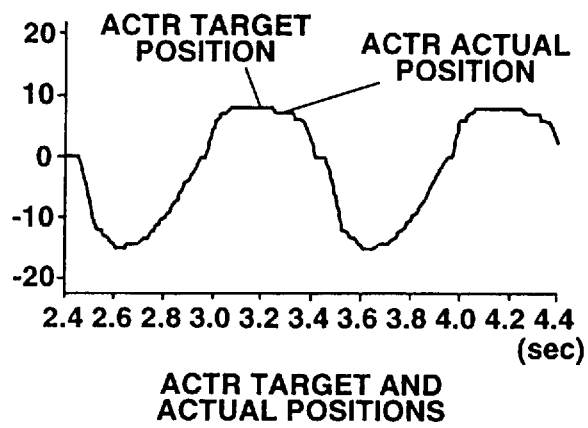
Figure 21A:
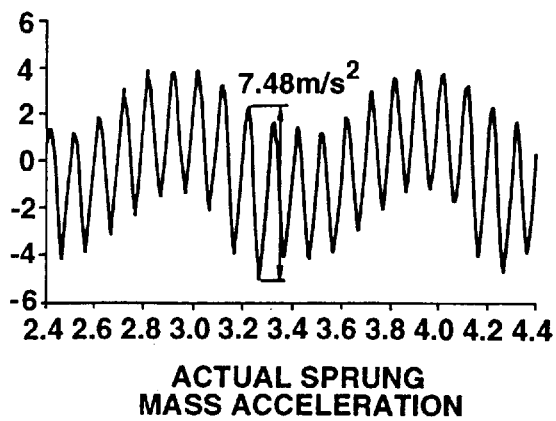
FIGS. 21A to 21C are time charts used in explaining the simulation results related to the conventional suspension control system.
Figure 21B:
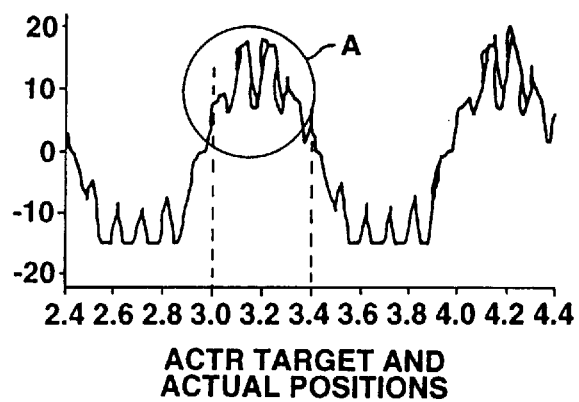
Figure 21C:
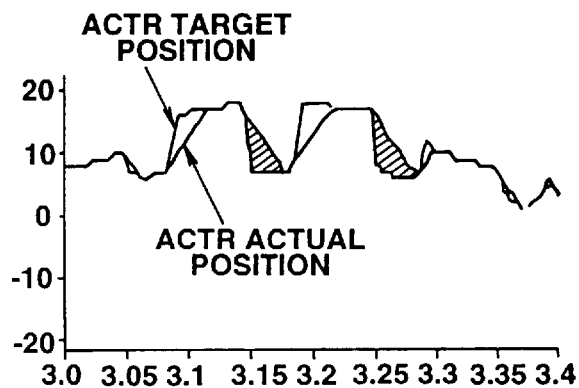

Although an excessive and/or insufficient control force is produced with the control signal V produced according to the invention, as described above, the area (energy) is much smaller than that provided with the conventional control signal V'. This can be seen from FIGS. 20A, 20B, 21A, 21B and 21C. FIG. 20A shows the actual sprung mass acceleration provided with the control signal V of the invention, and FIG. 20B shows the target and actual positions of the actuator ACTR provided with the control signal V of the invention. FIG. 21A shows the actual sprung mass acceleration provided with the conventional control signal V', and FIG. 21B shows the target and actual positions of the actuator ACTR provided with the conventional control signal V. It can be seen from FIG. 21C which is an enlarged view showing the portion enclosed by a circle A of FIG. 21B that the invention can minimize the great distortions introduced onto the actual sprung mass acceleration signal waveform provided with the conventional control signal V'.

Returning to FIGS. 19A to 19B, the character S indicates exciting ranges where the sprung mass velocity $\Delta x$ and the relative velocity $(\Delta x - \Delta x_0)$ have different signs. In these exciting ranges, it is unnecessary to change the control stroke (extension) side damping force characteristic position P since the low damping force characteristic acts on the opposite stroke (compression stroke) side. It is, therefore, possible to hold the pulse motor inoperative in the exciting ranges. This is effective to operate the pulse motor 3 in good response to the control signal V and also to reduce the duty ratio required to drive and retain the pulse motors 3.

Figure 22A:
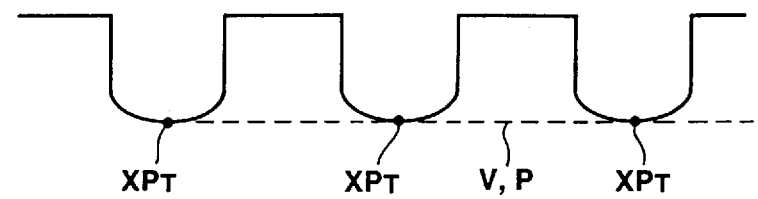
FIGS. 22A to 22C are time charts used in explaining the duty ratio required to drive and hold the corresponding pulse motor.
Figure 22B:
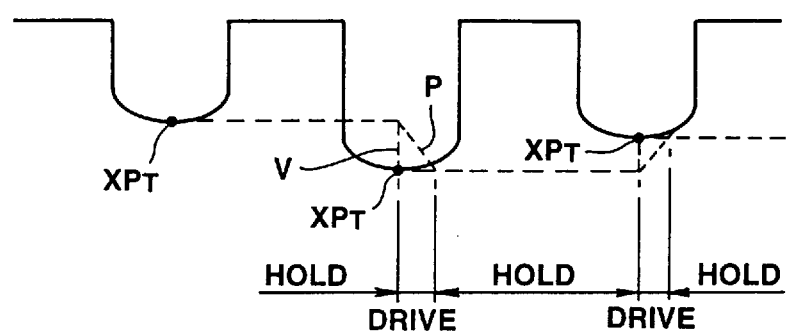
Figure 22C:
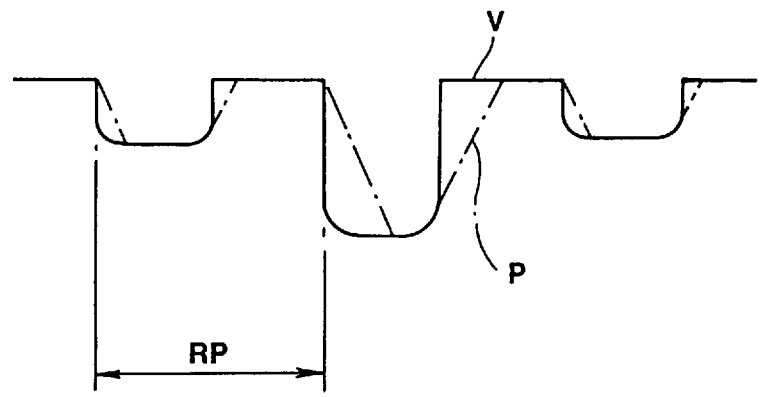

FIGS. 22A to 22C show the relationships between the control signal, indicated by the solid curve, and the damping force characteristic position, indicated by the broken line. In the illustrated case, the duty ratio required to drive and hold the pulse motor 3 ranges from 30% to 50%. With a control signal having a great amplitude, the pulse motor 3 has a slow response to the control signal and the duty ratio is almost 100%. The pulse motor 3 is required to have such a minimum response as to reciprocate between the extension side hard range HS and the soft range SS or between the compression side hard range SH and the soft range SS during one-half of the unsprung mass resonance period. Assuming now that the unsprung mass resonance frequency is 10 Hz, the pulse motor 3 is required to have such a response that it can reciprocate in 25 ms. According to the invention, the duty ratio required to drive and hold the pulse motor 3 is 0% when no fluctuation exists in the extension side peak value $XP_T$ of the relative velocity $(\Delta x - \Delta x_0)$, as shown in FIG. 22A and almost 50% even when the extension side peak value $XP_T$ of the relative velocity $(\Delta x - \Delta x_0)$ fluctuates. The pulse motor 3 may have such a minimum response as to reciprocate between the extension side hard range HS and the soft range SS or between the compression side hard range SH and the soft range SS during the unsprung resonance period RP. Assuming now the unsprung mass resonance frequency is 10 Hz, the pulse motor 3 may have such a response that it can reciprocate in 100 ms.

The signal processing circuit of FIG. 15 may be modified to calculate the control signal V as follows:

$$V = g \cdot V_U / XP'_T \quad (14)$$

$$V = g \cdot V_U / XP'_C \quad (15)$$

where g is a proportional constant, $V_U$ is the sprung mass component signal and $XP'_T$ and $XP'_C$ are the extension and compression side processed signals obtained in the ninth block B9 of FIG. 15. In this modification, averaged extension and compression side peak value $XP_T$-n and $Xp_C$-n may be calculated. The averaged extension and compression side peak value $XP_T$-n and $Xp_C$-n are used to calculate expansion and compression side processed signals $XP'_T$-n and $XP'_C$-n from the following equations:

$$XP_T\text{-}n = \{(\alpha \cdot XP_T(n) + \beta \cdot XP_T(n-1) + \gamma \cdot XP_T(n-2) + \eta \cdot XP_T(n-3)\}X(1/\alpha + \beta + \gamma + \eta) \quad (16)$$

$$XP_C\text{-}n = \{(\alpha \cdot XP_C(n) + \beta \cdot XP_C(n-1) + \gamma \cdot XP_C(n-2) + \eta \cdot XP_C(n-3)\}X(1/\alpha + \beta + \gamma + \eta) \quad (17)$$

where $\alpha$, $\beta$, $\gamma$ and $\eta$ are predetermined weights.

Alternatively, the signal processing circuit of FIG. 15 may be modified to detect a peak value of the relative velocity $(\Delta x - \Delta x_0)$ obtained in the eighth block B8. The absolute value $XP_{T,C}$ of the detected peak. value of the relative velocity $(\Delta x - \Delta x_0)$ is calculated and held until the next peak value of the relative velocity $(\Delta x - \Delta x_0)$ is detected. The held absolute value $XP'_{T,C}$ is used to calculate the control signal V. This calculation is made from the following equation:

$$V = g \cdot V_U / XP'_{T,C} \quad (18)$$

where g is a proportional constant and $V_U$ is the sprung mass component signal. Since the very low frequency components are cut, as sown in FIG. 17A, the relative velocity $(\Delta x - \Delta x_0)$ signal has almost no low frequency component. This permits such a control that the extension and compression sides are not separated. In this modification, the absolute value $XP_{T,C}$ of an averaged peak value may be calculated and used to calculate the processed signal $XP'_{T,C}$ from the following equation:

$$XP_{T,C} = \{(\alpha \cdot XP_{T,C}(n) + \beta \cdot XP_{T,C}(n-1) + \gamma \cdot XP_{T,C}(n-2) + \eta \cdot XP_{T,C}(n-3)\}X(1/\alpha + \beta + \gamma + \eta) \quad (19)$$

where $\alpha$, $\beta$, $\gamma$ and $\eta$ are predetermined weights.

Alternatively, the signal processing circuit. of FIG. 15 may be arranged to detect a peak value of the relative velocity $(\Delta x - \Delta x_0)$ obtained in the eighth block B8. The absolute value $XP_{T,C}$ of the detected peak value of the relative velocity $(\Delta x - \Delta x_0)$ is calculated and held until the next peak value of the relative velocity $(\Delta x - \Delta x_0)$ is detected. The held absolute value $XP'_{T,C}$ is used to calculate the reprocessed signal $KUS_{T,C}$ inversely proportional to the processed signal $XP'_{T,C}$. This calculation is made from the following equation:

$$KUS_{T,C} = 1/XP_{T,C} \quad (20)$$

The calculated reprocessed signal $KUS_{T,C}$ is used to calculate the control signal V. This calculation is made from the following equation:

$$V = g \cdot V_U \cdot KUS_{T,C} \quad (21)$$

where g is a proportional constant and $V_U$ is the sprung mass component signal. In this modification, the absolute value $XP_{T,C}$ of an averaged peak value may be calculated and used to calculate the processed signal $XP'_{T,C}$ from the following equation:

$$XP_{T,C} = \{(\alpha \cdot XP_{T,C}(n) + \beta \cdot XP_{T,C}(n-1) + \gamma \cdot XP_{T,C}(n-2) + \eta \cdot XP_{T,C}(n-3)\}X(1/\alpha + \beta + \gamma + \eta) \quad (22)$$

where $\alpha$, $\beta$, $\gamma$ and $\eta$ are predetermined weights.

Figure 23A:
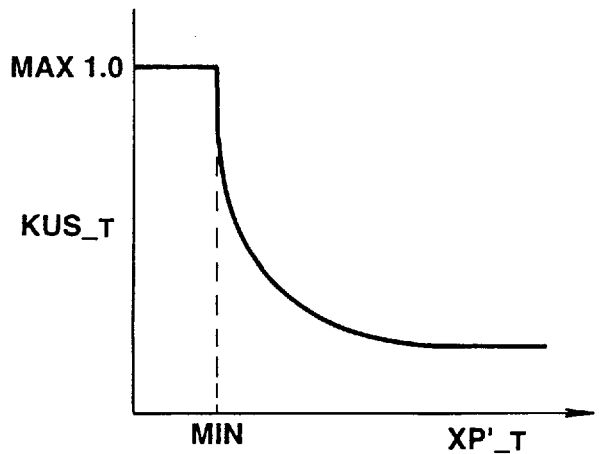
FIG. 23A is a graph of extension side reprocessed signal versus extension side processed signal.
Figure 23B:
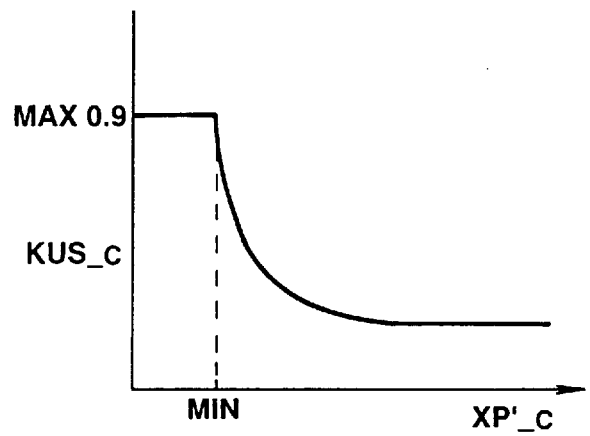
FIG. 23B is a graph of compression side reprocessed signal versus compression side processed signal.
Figure 23C:
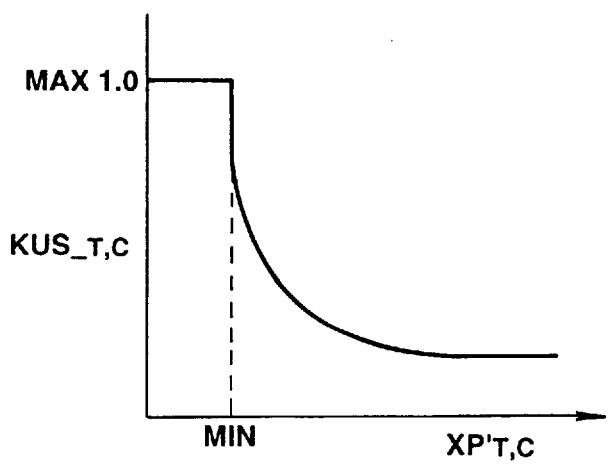
FIG. 23C is a graph of reprocessed signal versus processed signal.

While the invention has been described in connection with three vertical G sensors provided at front-left, front-right and rear-right road wheel positions, it is to be understood that the number and position of the vertical G sensors are not limited to the illustrated case. For example, the invention is applicable with the use of a single vertical G sensor provided on the front road wheel side. While the extension and compression side reprocessed signals KUS-T and KUS-C are described as calculated from Equations (7) and (8), it is to be understood that these reprocessed signals may be calculated from data programmed in the form of look-up tables, as shown in FIGS. 23A and 23B. While the reprocessed signal $K_{US-T,C}$ is described as calculated from Equation (20), it is to be understood that this reprocessed signal may be calculated from data programmed in the form of look-up tables, as shown in FIG. 23C. While the transfer function used in the eighth block B8 to calculate the relative velocities ($\Delta x - \Delta x_0$) based on the sprung mass vertical accelerations is calculated from Equation (6), it is to be understood that the transfer function may be replaced with a simpler transfer function Gs calculated from the following equation:

$$G_S = RS/DS + E \tag{23}$$

It is also to be understood that the gains $g_f$ and $g_r$ used in Equations (9a) to (12a) and (9b) to (12b) may be changed according to the vehicle speed. While the invention has been described in connection with a specified embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A suspension control system for use with an automotive vehicle supported on front-left and front-right road wheels at front-left and front-right road wheel positions and also on rear left and rear-right road wheels at rear-left and rear-right road wheel positions, comprising:

shock absorbers provided between sprung and unsprung masses of the vehicle at the respective road wheel positions for providing variable damping force characteristics;

at least one sensor for sensing a sprung mass vertical behavior and producing a sensor signal indicative of a sensed sprung mass vertical behavior;

a calculation unit for receiving the sensor signal fed from the sensor, the calculation unit further comprising:

a first calculating circuit for calculating sprung mass vertical velocities at the respective road wheel positions based on the sensed sprung mass vertical behavior;

a second calculating circuit for calculating relative velocities between the sprung and unsprung masses at the respective road wheel positions based on the sensed sprung mass vertical behavior with the use of a predetermined transfer function including terms related to damping coefficients of the respective shock absorbers; and a control unit for producing control signals based on the calculated sprung mass vertical velocities and the calculated relative velocities to control the damping force characteristics of the respective shock absorbers, the control unit further comprising a determining circuit for determining damping coefficients of the respective shock absorbers based on the corresponding control signals, and a varying circuit for varying the terms included in the predetermined transfer function based on the determined damping coefficients.

2. The suspension control system as claimed in claim 1, wherein the control unit includes a first control circuit provided for each of the shock absorbers to provide a low damping force characteristic on one of extension and compression stroke sides of the corresponding one of the shock absorbers when the damping force characteristic is controlled on the other stroke side of the one shock absorber, a second control circuit for controlling the damping force characteristic on the extension stroke side of the one shock absorber when the corresponding sprung mass vertical velocity is directed upward and on the compression stroke side of the one shock absorber when the corresponding sprung mass vertical velocity is directed downward.

3. The suspension control system as claimed in claim 2, wherein the control unit includes a producing circuit for producing an extension stroke side processed signal having a value held at a peak value of the corresponding relative velocity on the extension stroke side of the one shock absorber until the corresponding relative velocity renews the peak value thereof, a second producing circuit for producing a compression stroke side processed signal having a value held at a peak value of the corresponding relative velocity on the compression stroke side of the one shock absorber until the corresponding relative velocity renews the peak value thereof, and a setting circuit for setting the corresponding control signal at a value directly proportional to the corresponding sprung mass vertical velocity divided by the processed signal on the stroke side corresponding to the direction of the sprung mass vertical velocity.

4. The suspension control system as claimed in claim 3, wherein the control unit includes an averaging circuit for averaging the processed signals.

5. The suspension control system as claimed in claim 2, wherein the control unit includes a producing circuit for producing a processed signal having a value held at an absolute value of a peak value of the corresponding relative velocity until the corresponding relative velocity renews the peak value thereof, and a setting circuit for setting the corresponding control signal at a value directly proportional to the corresponding sprung mass vertical velocity divided by the processed signal.

6. The suspension control system as claimed in claim 5, wherein the control unit includes an averaging circuit for averaging the processed signals.

7. The suspension control system as claimed in claim 2, wherein the control unit includes a first producing circuit for producing an extension stroke side processed signal having a value held at a peak value of the corresponding relative velocity on the extension stroke side of the one shock absorber until the corresponding relative velocity renews the peak value thereof, a second producing circuit for producing a compression stroke side processed signal having a value held at a peak value of the corresponding relative velocity on the compression stroke side of the one shock absorber until the corresponding relative velocity renews the peak value thereof, a third producing circuit for producing an extension stroke side reprocessed signal having a value inversely proportional to the extension stroke side processed signal, a fourth producing circuit for producing a compression stroke side reprocessed signal having a value inversely proportional to the compression stroke side processed signal, and a setting circuit for setting the corresponding control signal at a value directly proportional to the corresponding sprung mass vertical velocity multiplied by the reprocessed signal on the stroke side corresponding to the direction of the sprung mass vertical velocity.

8. The suspension control system as claimed in claim 7, wherein the control unit includes an averaging circuit for averaging the processed signals.

9. The suspension control system as claimed in claim 7, wherein the control unit includes an averaging circuit for averaging the reprocessed signals.

10. The suspension control system as claimed in claim 2, wherein the control unit includes a producing circuit for producing a processed signal having a value held at an absolute value of a peak value of the corresponding relative velocity until the corresponding relative velocity renews the peak value thereof, a second producing circuit for producing a reprocessed signal having a value inversely proportional to the processed signal, and a setting circuit for setting the corresponding control signal at a value directly proportional to the corresponding sprung mass vertical velocity multiplied by the reprocessed signal.

11. The suspension control system as claimed in claim 10, wherein the control unit includes an averaging circuit for averaging the processed signals.

12. The suspension control system as claimed in claim 10, wherein the control unit includes an averaging circuit for averaging the reprocessed signals.

* * * * *